United States Patent
Welch

(10) Patent No.: US 9,855,966 B2
(45) Date of Patent: Jan. 2, 2018

(54) SHARPENING TOOL, SHARPENING SYSTEM AND KIT

(71) Applicant: Glenn S. Welch, Gilford, NH (US)

(72) Inventor: Glenn S. Welch, Gilford, NH (US)

(*) Notice: Subject to any disclaimer, the term of this patent is extended or adjusted under 35 U.S.C. 154(b) by 475 days.

(21) Appl. No.: 14/542,848

(22) Filed: Nov. 17, 2014

(65) Prior Publication Data
US 2015/0072602 A1 Mar. 12, 2015

Related U.S. Application Data

(63) Continuation-in-part of application No. 13/681,663, filed on Nov. 20, 2012, now Pat. No. 8,888,565.

(51) Int. Cl.
- *B24B 23/02* (2006.01)
- *B62B 17/00* (2006.01)
- *B24D 5/16* (2006.01)
- *B24B 19/00* (2006.01)

(52) U.S. Cl.
CPC ............ *B62B 17/00* (2013.01); *B24B 19/009* (2013.01); *B24B 23/02* (2013.01); *B24D 5/16* (2013.01)

(58) Field of Classification Search
CPC ............ B24B 23/02; B24B 9/04; B24B 17/00; B24D 5/16
USPC ......... 451/358, 359, 548, 541, 349, 462, 65, 451/180; 76/82, 83
See application file for complete search history.

(56) References Cited

U.S. PATENT DOCUMENTS

| | | | | |
|---|---|---|---|---|
| 2,455,597 A | * | 12/1948 | Metzger | B24B 13/01 29/DIG. 66 |
| 3,716,951 A | * | 2/1973 | Walters | B24D 7/16 451/342 |
| 3,742,652 A | * | 7/1973 | Enders | B24B 3/265 451/180 |
| 3,753,320 A | * | 8/1973 | Wurscher | B24B 3/26 451/180 |
| 4,574,529 A | * | 3/1986 | Wurscher | B24B 3/26 451/282 |
| 4,839,997 A | * | 6/1989 | Pritchard | A46D 9/02 451/259 |
| 4,850,150 A | * | 7/1989 | Bishop | B24B 3/265 451/282 |
| 4,947,598 A | * | 8/1990 | Sekiya | B24B 7/228 125/11.01 |
| 5,331,771 A | * | 7/1994 | Coushman | B24B 19/16 451/344 |

* cited by examiner

*Primary Examiner* — Robert Rose
(74) *Attorney, Agent, or Firm* — Michael Persson; Catherine Napjus; Lawson, Persson & Chisholm P.C.

(57) ABSTRACT

The present invention is a sharpening tool and sharpening system for sharpening snowmobile carbide wear rails and studs and a kit of parts that includes the sharpening tool and a steering member having a carbide wear rail. The sharpening tool is attachable to the chuck of a hand held drill and includes a shaft attachable to the chuck of the hand held drill and cylindrical head affixed to the shaft. The cylindrical head includes a rail groove surfaced in an abrasive material for sharpening wear rails.

20 Claims, 19 Drawing Sheets

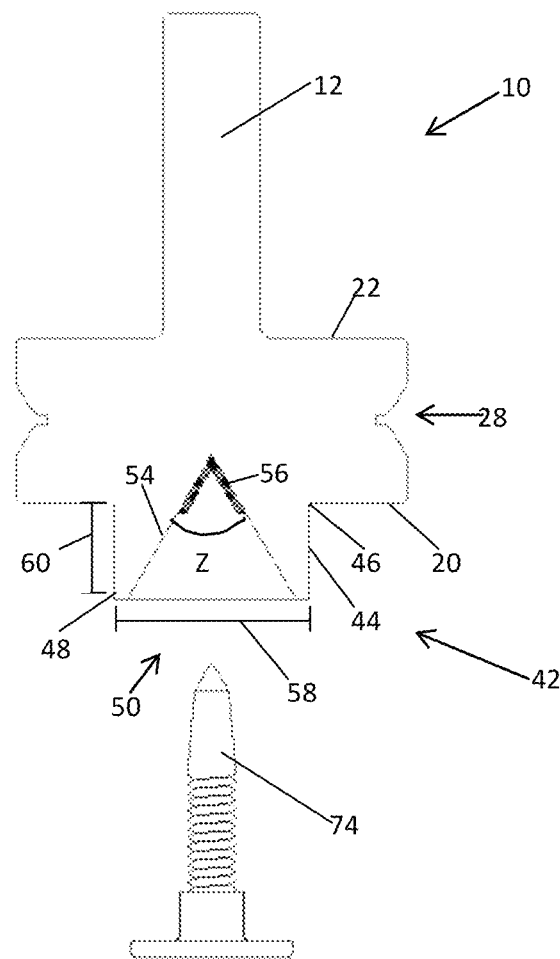

SHARPENING TOOL, SHARPENING SYSTEM AND KIT

CLAIM OF PRIORITY

This application claims the benefit of priority under 35 USC 119 of Canadian Patent Application Serial No. 2,833,573, filed on Nov. 19, 2013, and is a continuation in part of co-pending U.S. patent application Ser. No. 13/681,663, filed on Nov. 20, 2012.

FIELD OF THE INVENTION

The present invention relates to sharpening snowmobile ski runners and studs, and in particular, to an easy-to-use and cost-efficient tool for sharpening snowmobile wear rails and studs.

BACKGROUND

Snowmobiling is a popular winter activity in cold climates. The steering of snowmobiles is conventionally accomplished by a pair of ground engageable skis which are mounted on the front of the snowmobile and are turned in the direction in which the snowmobile is to be propelled. Conventional ski runners merely slide along the surface of the snow without "digging in." This makes the snowmobile difficult to control in icy conditions, especially at high speeds, which greatly increases the danger of injury or death.

In order to increase the control of snowmobiles in icy conditions, ski runners have been developed that include carbide runners or skegs on the underside thereof, having sharp carbide wear rails that cut or bite into the hardened surface to positively control the turning of the snowmobile. Unfortunately, these ski runners lose their effectiveness once the carbide wear rails become dulled, rendering them as dangerous as conventional skis in icy conditions. Thus, either the carbide wear rails (skegs), or the entire ski needs to be replaced.

In order to reduce the cost and inconvenience of ski runners having integral carbide rails, removable wear bars have been developed that may be attached to conventional ski runners to produce the same results. Examples of such wear bars are those sold by International Engineering & Manufacturing, Inc., of Hope, Mich., under the trademark "WOODY'S". One such wear bar is shown in FIGS. 4A & 4B and includes two sharpened carbide wear rails that are permanently installed within steel skegs. These wear bars are attached to the bottom surface of conventional skis and are removed when the carbide wear rails become dull and replaced with new ski runners. Once they become dull, these wear bars currently need to be discarded.

The need to replace skis or wear bars having dulled carbide wear rails has significant disadvantages. The cost of both ski runners and wear bars is significant, with a set of wear bars typically costing $120.00 or more. In addition, it is common for snowmobilers to spend multiple days touring on their machines. Thus, unless the snowmobiler packs a spare set of wear bars, there is a significant risk that they will be riding with dangerously dulled carbide wear rails by the end of their trip.

Therefore, there is a need for a way to maintain a sharp carbide wear rail on a ski or a wear bar that does not require that the wear rail or rail bar be replaced and that allows a user to sharpen the wear rail in the field.

SUMMARY OF THE INVENTION

The present invention is sharpening tools for sharpening carbide wear rails on snowmobile ski runners and ski wear bars.

In its most basic form, the first sharpening tool of the present invention includes a shaft and a substantially cylindrical head having an outer surface to which an abrasive material is disposed. The shaft and cylindrical head are preferably manufactured from the same steel alloy, preferably 4140 alloy. However, other alloys, such as 1018 steel alloy, or other materials commonly used in the art of rotating tools and to which the abrasive material may be disposed, may be used to achieve similar results.

The shaft is preferably a narrow cylinder attachable to a rotating power tool. In the preferred embodiment of the system, the shaft has a cylindrical shape and is gripped by the chuck of a hand held drill in the same manner as the chuck would grip a drill bit. However, in other embodiments, the shaft may have a hexagonal cross section for attachment to a quick connect hex driver, such as those found on drywall screw guns, or may take other art recognized forms. Regardless of how it is shaped or gripped, the shaft of the sharpening tool is rotated rapidly when the rotating power tool is energized in the same manner as a drill bit would be when mounted within the chuck of a hand held drill.

The preferred shaft is 1.3 inches long and has a diameter of 0.25 inches, which allows it to be gripped by chucks of most conventional hand held drills. The shaft is attached to the cylindrical head of the sharpening tool, preferably by brazing. However, in some embodiments, the shaft and cylindrical head are machined from a single bar of material. In embodiments in which the shaft is brazed to the cylindrical head, the full length of the shaft is preferably approximately 1.58 inches, with 0.375 inches brazed within the cylindrical head and only 1.3 inches extending out from the cylindrical head. It is preferred that the shaft and cylindrical head both be made of the same steel alloy, but other art recognized materials to which the abrasive material may be disposed may be substituted to achieve similar results.

The cylindrical head of the sharpening tool is a short wide cylinder when compared to the shaft. The cylindrical head has a body having a substantially round cross section with a face on either side of the body. The shaft extends from the center of one of the faces of the cylindrical head. The cylindrical head preferably has a diameter of 1.5 inches and a width of 0.637 inches. The diameter is the distance across the center of either of the faces of the cylindrical head. The width is the distance between the faces.

At least one rail groove runs around the circumference of the round body of the cylindrical head. In embodiments in which the sharpening tool has a single rail groove, the rail groove is preferably disposed at the midpoint between the two faces. The rail groove is V-shaped and is surfaced with an abrasive material, preferably a diamond material having a particle size of between 40 and 60 grit. A wear rail to be sharpened will be placed in the rail groove and sharpened against the diamond grit surface. The V-shaped rail groove comes to a point with a preferable angle of between 60° and 80°. It is preferable that, partway between the point of the "V" of the rail groove and a second location where the rail groove meets the round body of the cylindrical head, the angle of the rail groove flares out into a wider angle. The wider angle is preferably approximately 120°.

Some embodiments of the first sharpening tool of the present invention also include a stud sharpener. The stud sharpener includes a tube body extending from the center of the face of the cylindrical head from which the shaft does not extend. The tube body preferably has a length of 0.5 inches and a diameter of 0.75 inches. The inside of the tube body includes a stud groove. The stud groove is cylindrical, allowing for entry of the stud to be sharpened, and preferably comes to a point with an angle of 60°. Like the rail groove, the stud groove is surfaced with an abrasive material, preferably a diamond material having a particle size of between 40 and 60 grit. A stud to be sharpened is inserted in the stud groove and sharpened against the diamond grit surface. It is preferred that the stud sharpener is one integrated piece with the cylindrical head, but it may also be a separate piece that is brazed onto the cylindrical head. The point of the stud groove preferably extends into the cylindrical head.

The first sharpening tool of the present invention, as described above, will sell at retail for approximately $50-$60. It may be used for sharpening 5-10 times before the surfaces of the rail groove and stud groove are worn too low from the grinding. The cost for each sharpening, therefore, may be as low as approximately $3 per sharpening, as compared to the present cost of $120 to replace a pair of dulled wear bars. This is a sizable savings.

The second sharpening tool of the present invention is similar to the embodiments of the first sharpening tool that include a stud sharpener, except that the stud groove of the second sharpening tool is wider than the stud groove of the first sharpening tool, as described below. In its most basic form, the second sharpening tool of the present invention is capable of sharpening studs, and includes a shaft that is attachable to a rotating power tool and a substantially cylindrical head extending from the shaft. As an example of the shaft being attachable to a rotating power tool, one of ordinary skill in the art may envision the shaft being used with a power drill, and integrated with the power drill like a drill bit might be. The head is "substantially cylindrical" in that it has a basic cylindrical shape, but it may also include indentations or grooves within the circumference of the cylindrical shape; indentations in one of the flat faces of the cylindrical shape; and/or additional flat layers that do not extend over the entire flat face on one or both of the flat faces, such as a circular base layer surrounding the intersection of the shaft with the cylindrical head. The substantially cylindrical head includes a top face; a bottom face, from the center of which the shaft extends; a round body extending between the top and bottom faces; and a stud groove cut into the top face. The stud groove includes a circular wide opening in the top face that narrows into a circular narrow substantially flat center disposed within the height of the cylinder. The wide opening has a diameter that is greater than a diameter of the narrow center. Angled sides connect the wide opening and the narrow center such that a cross-section of the stud groove is substantially trapezoidal. The angled sides are coated with abrasive material.

The narrow center is "substantially flat" rather than perfectly flat in that the middle of the narrow center may be slightly raised or further inlaid. In some embodiments, the narrow center is perfectly flat. The cross-section of the stud groove is "substantially trapezoidal" in that the narrow center, forming a side of the trapezoid, may not be perfectly flat, as described above. In some embodiments, where the narrow center is perfectly flat, the cross-section of the stud groove is fully trapezoidal.

The abrasive material coating the angled sides is preferably a diamond material. Examples of the diamond material include diamond grit of various sizes or electroplated diamonds, but also include other types of coating that utilize diamonds to make the coating abrasive. All such coatings are included within the term "diamond material" as used herein.

The top face of the second sharpening tool preferably has a diameter between 3.6 and 3.8 cm, preferably 3.7 cm. The circular wide opening preferably has a diameter between 2.7 and 2.9 cm, preferably 2.8 cm. The circular narrow center preferably has a diameter between 2.2 and 2.4 cm, preferably 2.3 cm. Each of these diameters maybe greater than or less than the preferred diameters provided above.

Preferred embodiments of the second sharpening tool also include at least one rail groove as described below with respect to the third sharpening tool of the present invention.

The third sharpening tool of the present invention is similar to embodiments of the first sharpening tool that include a rail groove, except that the abrasive material in the rail groove of the second sharpening tool extends farther into the rail groove than the abrasive material in the third sharpening tool, as described below. In its most basic form, the third sharpening tool of the present invention is capable of sharpening dull snowmobile wear rails. Like the first and second sharpening tools described above, the third sharpening tool also includes a shaft that is attachable to a rotating power tool and a substantially cylindrical head extending from the shaft, where the cylindrical head includes a top face and a bottom face, from the center of which the shaft extends, and a round body extending between the top and bottom faces. The cylindrical head of the third sharpening tool includes at least one rail groove extending into the round body around a circumference of the round body such that the rail groove runs parallel to the circumferences of both the top and bottom faces of the cylindrical head. The rail groove includes a rectangular unobstructed space with two sides, a flat bottom, and an opening; center sections flaring outward from either side of the two sides of the unobstructed space so that the two sides and center sections form a first obtuse angle; flare sections further flaring outward from the center sections such that the flare sections and the center sections form a second obtuse angle and the flare sections and the surface of the round body form a third obtuse angle; and an abrasive material coated on the center and flare sections.

Some embodiments of the third sharpening tool of the present invention include two rail grooves. It is preferred that the abrasive material coated on the center and flare sections be diamond material, as described above with reference to the second sharpening tool of the present invention. The first obtuse angle is preferably between 130° and 150°, preferably 140°. The second obtuse angle is preferably between 150° and 170°, preferably 160°. The third obtuse angle is preferably between 140° and 160°, preferably 150°. Some embodiments of the third sharpening tool of the present invention include a stud groove for grinding studs as described above with reference to the first and second sharpening tools of the present invention.

The third sharpening tool of the present invention may come in a large range of sizes, but has two preferred sizes. With the first preferred size, the cylindrical head has a diameter of between 2.9 and 3.1 cm, preferably 3.0 cm and a width of between 1.8 cm and 2.0 cm, preferably 1.9 cm; the distance between the intersections of the flare sections and the surface of the round body is between 1.8 cm and 2.0 cm, preferably 1.9 cm; and the flat bottom is between 0.05 cm and 0.15 cm, preferably 0.10 cm wide. With the second preferred size, the cylindrical head has a diameter of between 3.6 cm and 3.8 cm, preferably 3.7 cm and a width of between 1.05 cm and 1.25 cm, preferably 1.15 cm; the distance between the intersections of the flare sections and the surface of the round body is between 0.6 cm and 0.8 cm, preferably 0.7 cm; and the flat bottom is between 0.05 cm and 0.15 cm, preferably 0.10 cm wide. Each of these measurements is approximate and it is understood that third sharpening tools with only slight variations in these measurements are also considered to be among the preferred sizes of the third sharpening tool.

The sharpening system of the present invention includes any embodiment of the first, second, or third sharpening tools, as described above, and a rotating power tool. The preferred rotating power tool is a hand held drill that includes a chuck, to which the shaft of the sharpening tool is attached. The chuck of the drill is the part that normally holds a drill bit and spins when the drill is in use. The shaft is gripped by the chuck just as the chuck would grip a drill bit. In this way, the shaft of the sharpening tool is spun rapidly when the drill is in use, just as a drill bit would be.

The kit of the present invention includes any embodiment of the first, second, or third sharpening tool, as described above, and a steering member having at least one wear rail. The steering member may be a snowmobile ski, ski runner, or wear bar upon which at least one wear rail is disposed. Some embodiments of the kit also include a separate stud sharpening tool for sharpening studs disposed upon snowmobile tracks.

Therefore, it is an aspect of the present invention to provide a sharpening tool for use with a conventional hand held drill.

It is a further aspect of the present invention to provide a sharpening tool capable of sharpening both wear rails and studs.

It is a further aspect of the present invention to provide a sharpening system that is the combination of the sharpening tool and a hand held drill or other rotating power tool.

It is a further aspect of the present invention to provide a kit for sharpening dull wear rails and studs, including the dull wear rails and studs and the sharpening tool of the present invention.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 6 is a cutaway side view of an embodiment of the first sharpening tool of the present invention with a stud sharpener and a stud to be applied to the stud sharpener.

DETAILED DESCRIPTION

Figure 1:
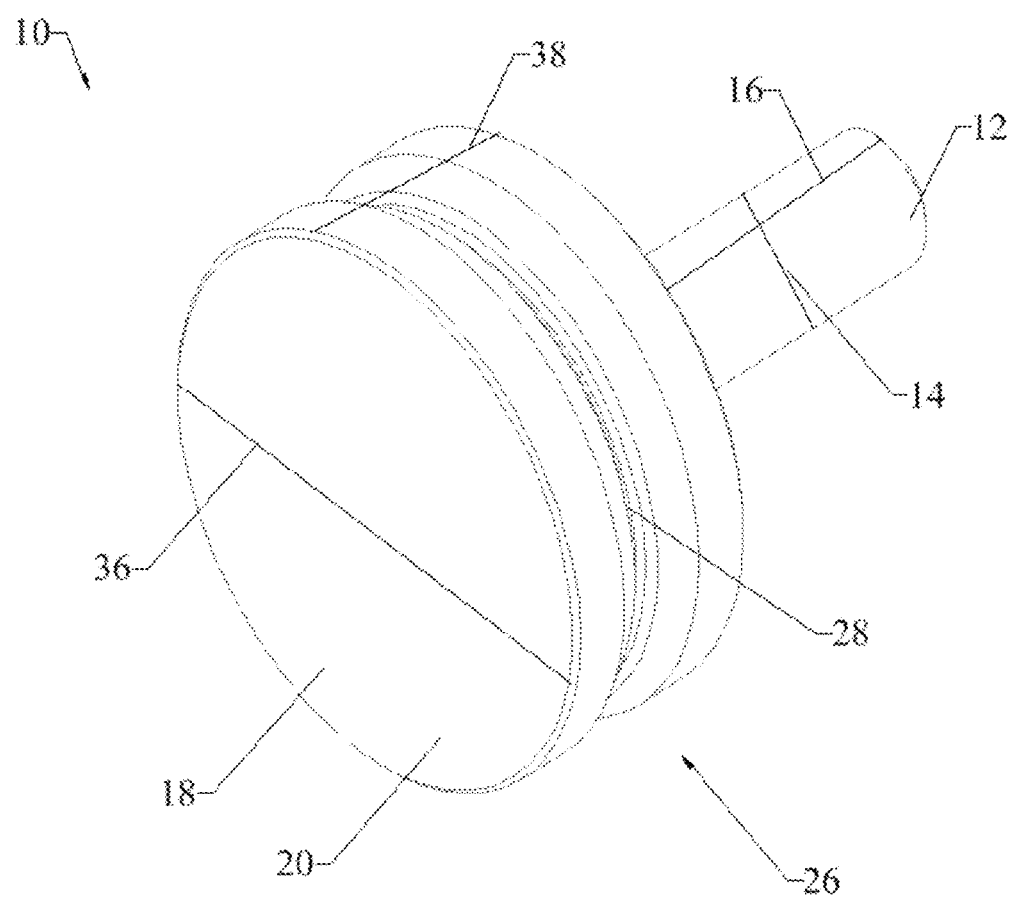
FIG. 1 is a perspective view of the preferred embodiment first sharpening tool of the present invention with no stud sharpener.

Referring first to FIG. 1, a perspective view of sharpening tool 10 is shown. Sharpening tool 10 includes shaft 12 and cylindrical head 18. Cylindrical head 18 includes top face 20 and bottom face 22 (shown in FIG. 2A), opposite from top face 20. Shaft 12 extends from the center of bottom face 22. Shaft 12 preferably has length 16 of 1.3 inches and diameter 14 of 0.25 inches, although the length and diameter may be larger or smaller in some embodiments. Shaft 12 is dimensioned to attach to the chuck of a hand held drill or other rotating power tool. However, as noted above, in other embodiments, the shaft 12 may have a hexagonal cross section for attachment to a quick connect hex driver, such as those found on drywall screw guns, or may take other art recognized forms.

Figure 8:
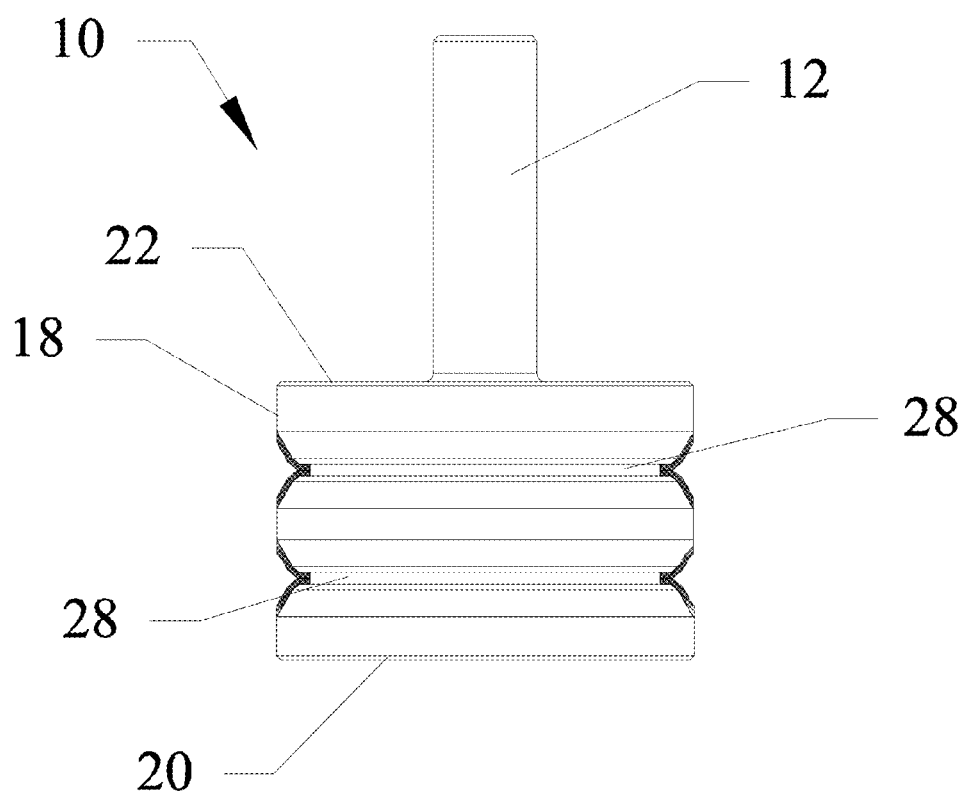
FIG. 8 is a side view of an embodiment of the first sharpening tool of the present invention having multiple rail grooves.

Cylindrical head 18 has a round body 26 that extends between top and bottom faces 20, 22. Rail groove 28 extends around the circumference of round body 26. In embodiments of the sharpening tool 10 that have a single rail groove 28, the rail groove 28 is preferably disposed halfway between top and bottom faces 20, 22. However, the rail groove 28 may be disposed at any location between the top and bottom faces 20, 22. Further, as shown in FIG. 8, the sharpening tool 10 may include multiple rail grooves 28 disposed about the circumference of round body 26.

Cylindrical head 18 preferably has diameter 36 of 1.5 inches and width 38 of 0.637 inches. This diameter 36 is preferred as it produces a 6:1 speed ratio that allows the body 26 of the sharpening tool 10 to rotate at an adequate speed when used with slower conventional hand held drills, which typically rotate at speeds of between 1000 and 1500 RPM. However, in embodiments in which the sharpening tool 10 is used with rotating power tools that rotate at higher speeds, such as drywall screw guns or corded high speed drills, the diameter 36 of cylindrical head 18 may be reduced.

Figure 2A:
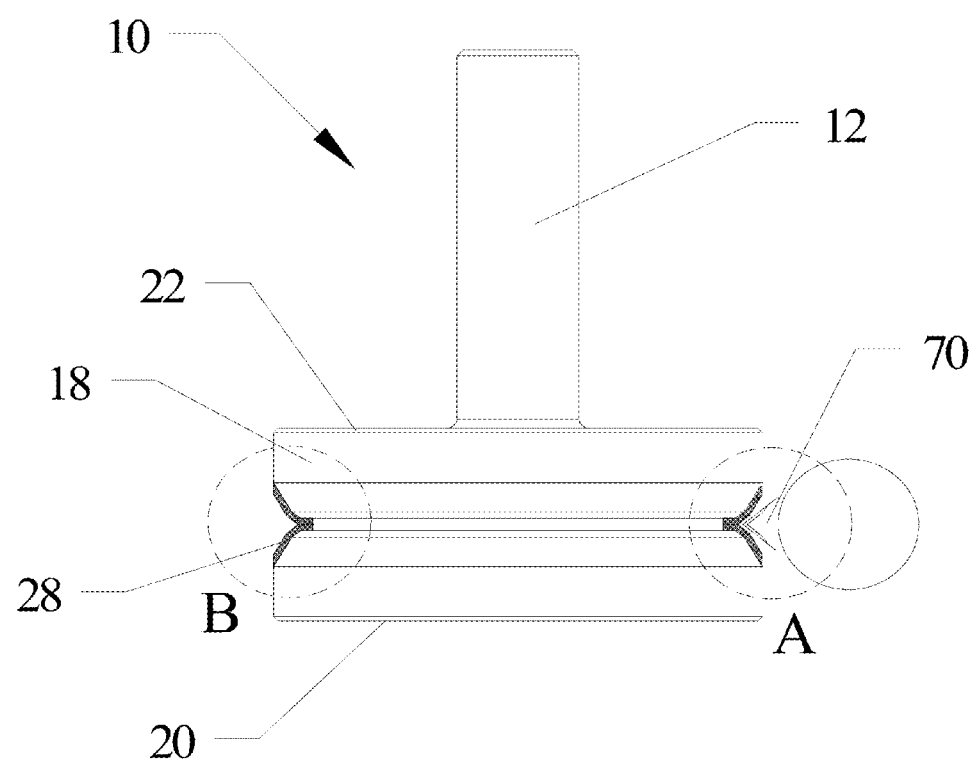
FIG. 2A is a side view of the one embodiment of the first sharpening tool of the present invention.
Figure 2B:
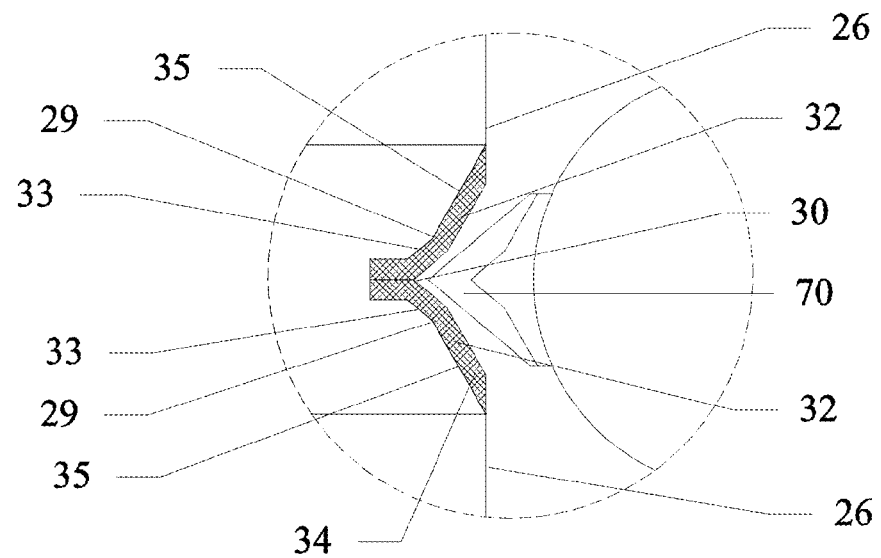
FIG. 2B is a blown up detail of section B of the view of FIG. 2A.
Figure 2C:
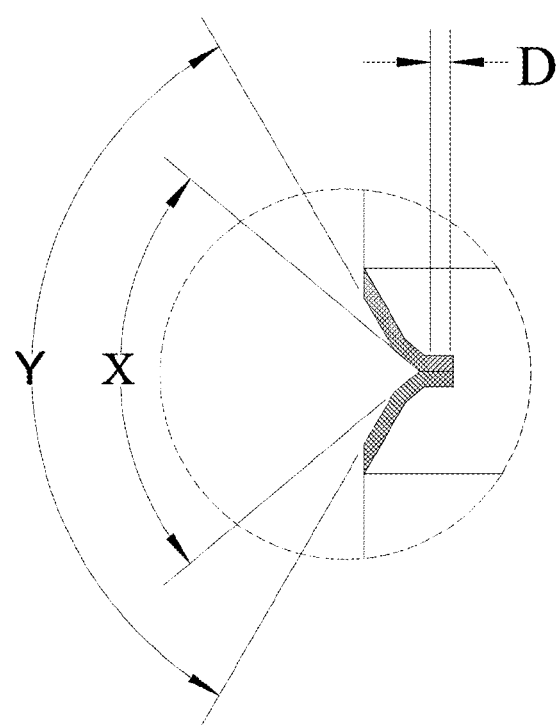
FIG. 2C is a blown up detail of section C of the view of FIG. 2A.

Now referring to FIGS. 2A-2C, a side view of one embodiment of the sharpening tool 10 is shown. Dull wear bar 70 is being placed in rail groove 28 for sharpening. Rail groove 28 includes two sets of angled surfaces 33, 35. Inner set of angled surfaces 33 forms an angle X of between 60° and 80°. Outer set of angled surfaces 35 intersects the inner set of angled surfaces 33 and forms a more obtuse angle Y of 120°. Outer set of angled surfaces 35 intersects the side of the round body 26. In this embodiment, the inner set of angled surfaces 33 intersects at point 30 such that the rail groove 28 is substantially V-shaped. Both sets of angled surfaces 33, 35 are coated in abrasive material 34, which is preferably diamond grit but may be other art recognized abrasive materials capable of sharpening carbide. Distance D represents how far abrasive material 34 is allowed to extend into rail groove 28, and is preferably no more than 0.039 inches.

Figure 3A:
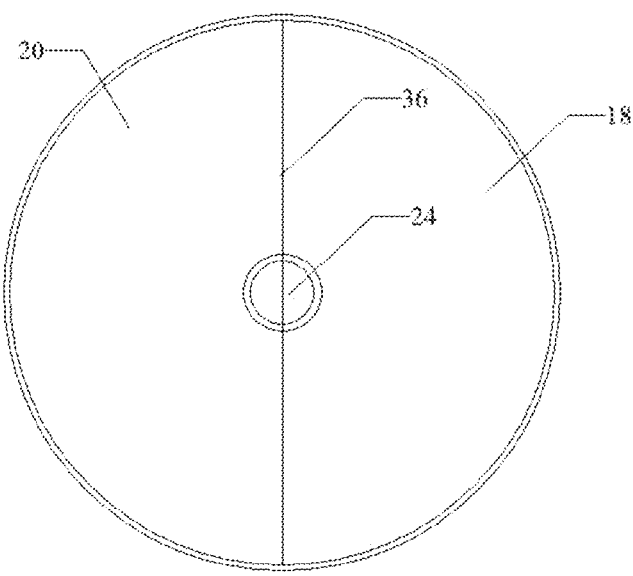
FIG. 3A is a top down view of the cylindrical head of the preferred embodiment of the first sharpening tool of the present invention.

Now referring to FIGS. 3A through 3F, the preferred embodiment of the sharpening tool is shown. FIG. 3A is a top down view of cylindrical head 18 with diameter 36 and center 24. The lines indicating center 24 show approximately where shaft 12 is positioned on the other side of cylindrical head 18, although shaft 12 is not shown in this view, and it is understood that no such visible indication of center 24 is necessarily present.

Figure 3B:
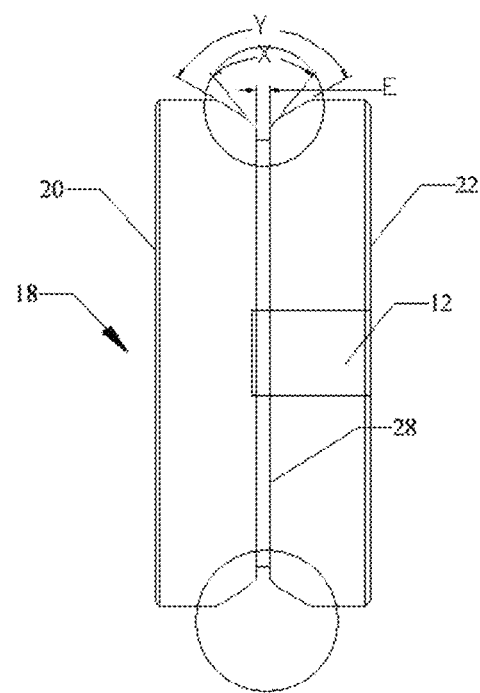
FIG. 3B is a side view of the cylindrical head of the preferred embodiment of the first sharpening tool of the present invention.

FIG. 3B is a side view of cylindrical head 18 with top and bottom faces 20, 22 and a single rail groove 28 extending around the cylindrical head 18. The positioning of shaft 12 is again indicated although it is understood that this positioning of shaft 12 within cylindrical head 18 is not actually visible. Shaft 12 extends into cylindrical head 18 and is preferably affixed there by brazing. However, as noted above, shaft 12 may be formed or machined integral to the head 18 in some embodiments. Distance D, which is the preferred gap between the sides of rail groove 28, as explained below with reference to FIG. 3D, is preferably 0.035 inches.

Figure 3C:
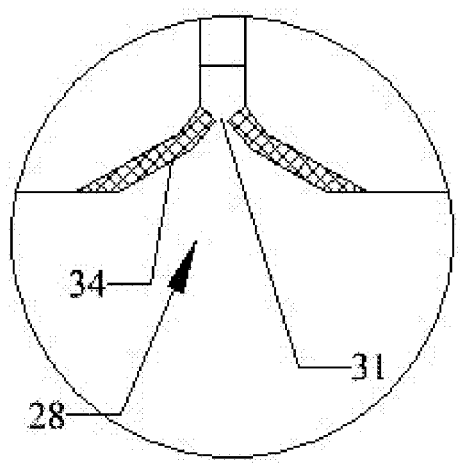
FIG. 3C is blown up details of the rail groove of the preferred embodiment of the first sharpening tool of the present invention.

FIG. 3C is a blown up detail of rail groove 28. FIG. 3C shows the preferred embodiment of rail groove 28, which is identical to what is described with reference to FIGS. 2A-2C except that abrasive material 34 does not extend all the way into distance D. Instead, point 30 is replaced by a small gap 31 leading into distance D within rail groove 28. This embodiment is preferred as it allows the tip of the wear rail to fit within the gap 31 and not be flattened during sharpening. It also saves on the amount of abrasive material 34 necessary and makes manufacture of sharpening tool 10 easier and less expensive. Although the embodiments of FIGS. 2A-2C and 3A-3F each show a rail groove 28 with two sets of angled surfaces 33, 35, it is recognized that a single set of angled surfaces may be utilized to achieve acceptable results. However, the use of two sets of angled surfaces 33, 35 produces superior results and is preferred.

Figure 3D:
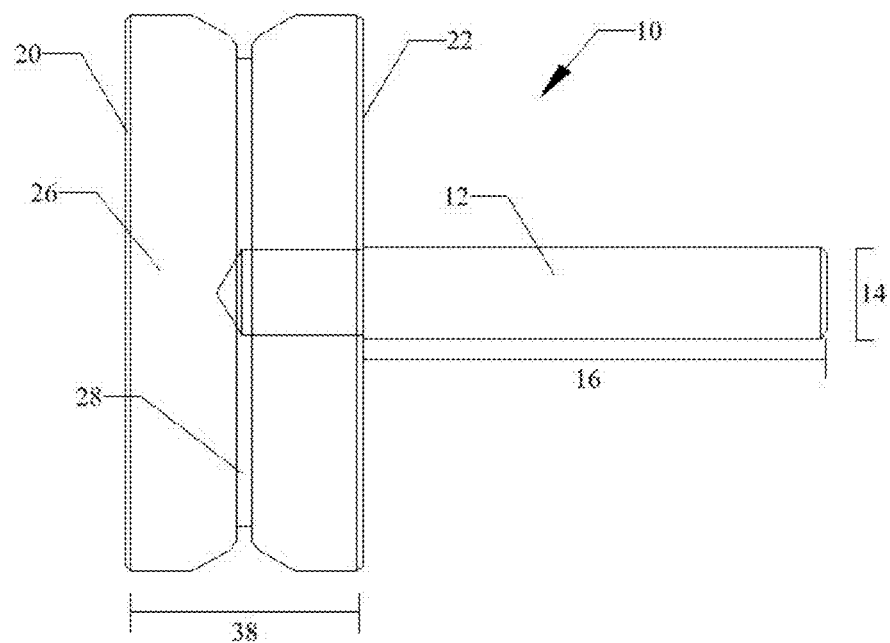
FIG. 3D is a side diagram of the preferred embodiment of the first sharpening tool of the present invention.
Figure 3E:
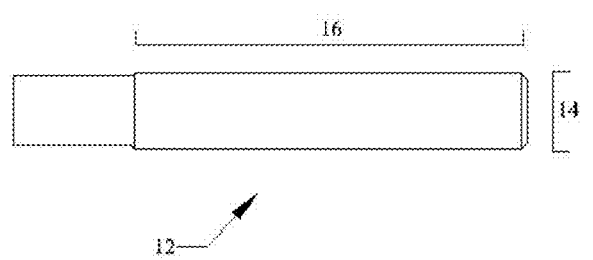
FIG. 3E is a side view of the shaft of the preferred embodiment of the first sharpening tool of the present invention.
Figure 3F:
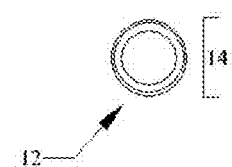
FIG. 3F is a top down view of the shaft of the preferred embodiment of the first sharpening tool of the present invention.

FIG. 3D is a side diagram of sharpening tool 10 of the present invention. The insertion of shaft 12 into cylindrical head 18 is shown. FIG. 3D shows the width 38 of the cylindrical head 18 and a variation on shaft 12 where the tip inserted into cylindrical head 18 is pointed. Shaft 12 has length 16 of 1.3 inches, and diameter 14 of 0.375 inches. Again, the lines indicating the portion of shaft 12 inserted into cylindrical head 18 are for illustrative purposes only and are understood to not be actually visible. This portion of the shaft 12 has a length of approximately 0.4 inches. FIG. 3E is a side view of shaft 12 when not inserted into cylindrical head 18. Unlike shaft 12 shown in FIG. 3D, the top of the portion of shaft 12 in FIG. 3E that will be inserted into cylindrical head 18 is flat rather than pointed. Length 16 and diameter 14 are again indicated. FIG. 3F is a top down view of shaft 12 showing diameter 14.

Figure 4A:
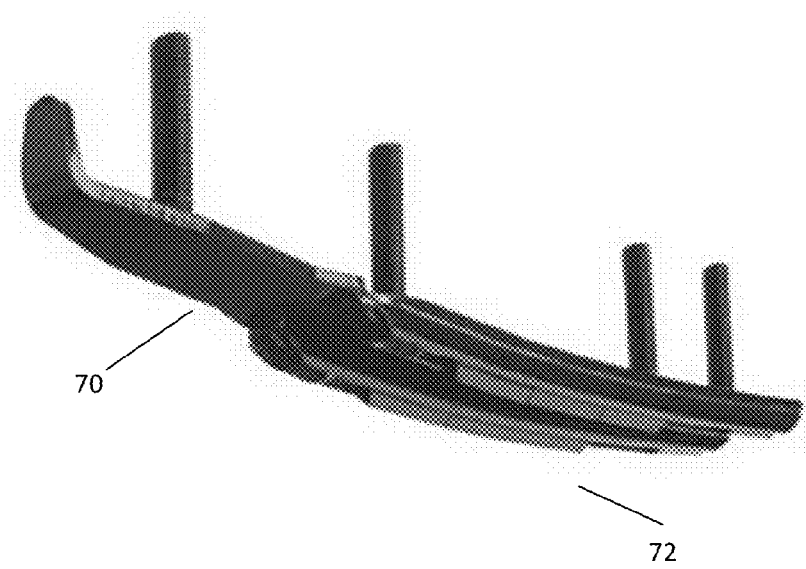
FIG. 4A is a perspective view of a prior art wear bar having two wear rails.
Figure 4B:
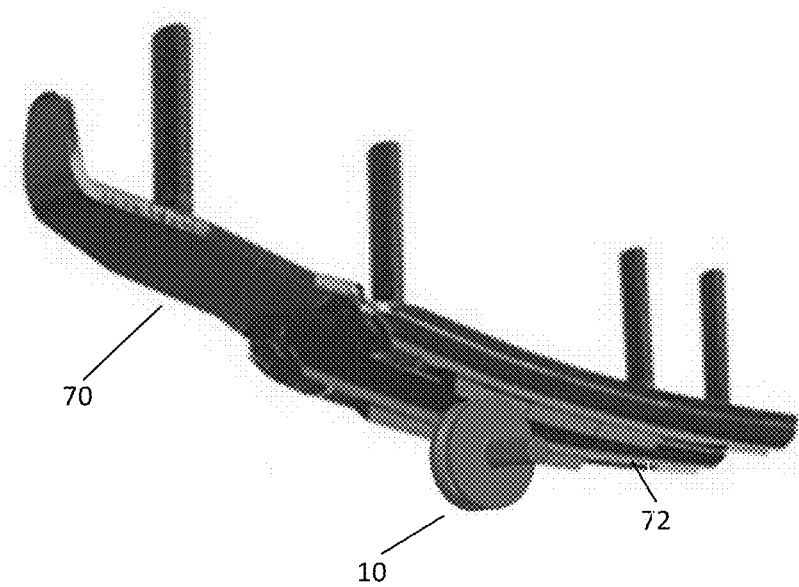
FIG. 4B is a perspective view of a sharpening tool of the present invention being applied to a wear rail of a wear bar having two wear rails.

Now referring to FIGS. 4A and 4B, a prior art dual rail wear bar 70 is shown with and without the application of sharpening tool 10, respectively. In FIG. 4B, sharpening tool 10 is applied to one wear rail 72 of wear bar 70. Although not visible from this perspective, wear rail 72 is inserted into rail groove 28 of sharpening tool 10 and sharpened against abrasive material 34.

Figure 5:
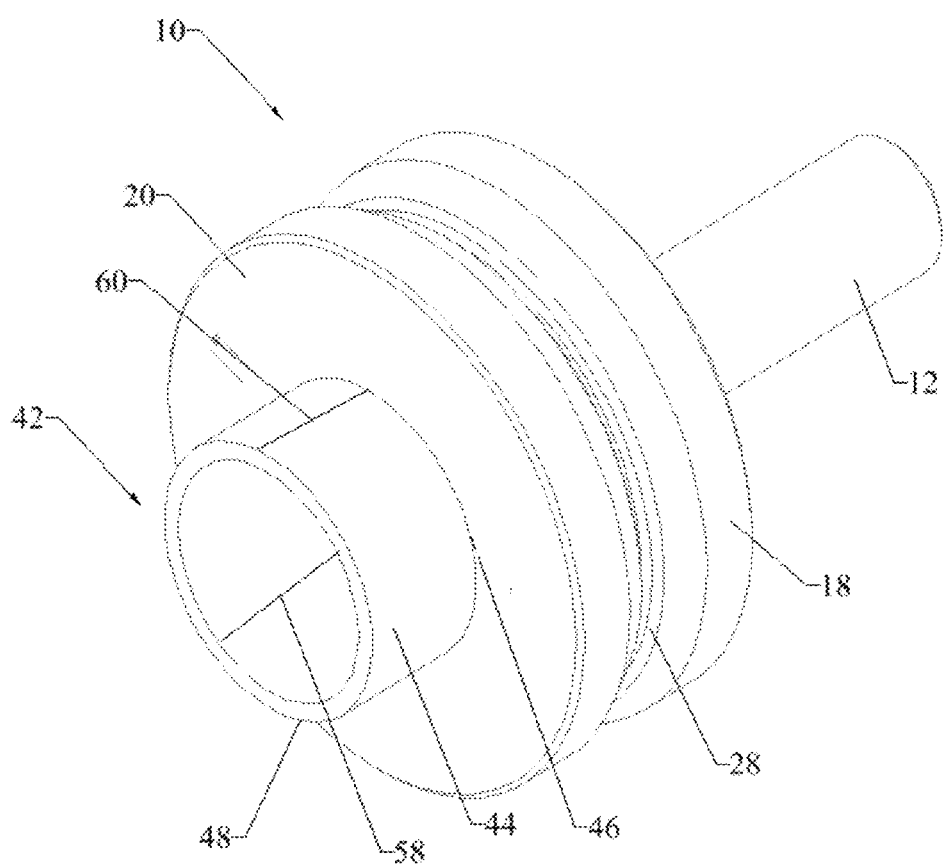
FIG. 5 is a perspective view of an embodiment of the first sharpening tool of the present invention with a stud sharpener.

Now referring to FIGS. 5 and 6, sharpening tool 10 including stud sharpener 42 is provided. Stud sharpener 42 has tube body 44 with first end 46 extending from top face 20 of cylindrical head 18 and second end 48. Tube body 44 has length 60 of 0.5 inches and diameter 58 of 0.75 inches. Dull stud 74 is inserted into tube body 44 for sharpening. As shown in FIG. 6, the inside of tube body 44 includes stud groove 50. Stud groove 50 includes a surface 54 with an abrasive material 56 against which a stud may be sharpened. As was the case with the abrasive material 34 disposed in the rail groove 28, abrasive material 56 is preferably a diamond material having a particle size of between 40 and 60 grit. Stud groove 50 includes angle Z at the point of stud groove 50, which is approximately 60°. Stud groove 50 extends into cylindrical head 18, piercing the plane of top face 20. In other embodiments, stud groove 50 does not extend so far and is included within length 60 of tube body 44 so that stud groove 50 does not pierce the plane of top face 20.

Figure 7A:
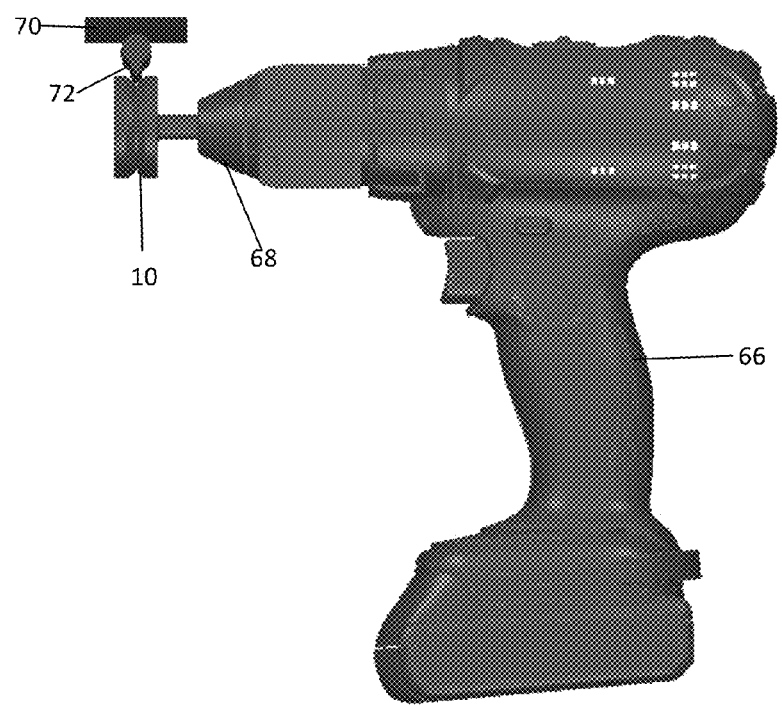
FIG. 7A is a side view of one embodiment a sharpening tool attached to a hand held drill and applied to a wear bar having a single wear rail to be sharpened.
Figure 7B:
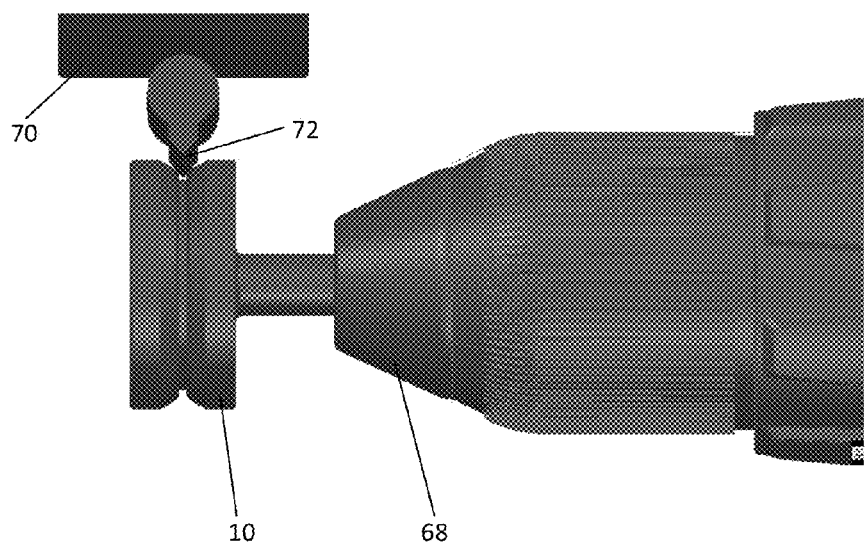
FIG. 7B is a close up side view of FIG. 7A.
Figure 7C:
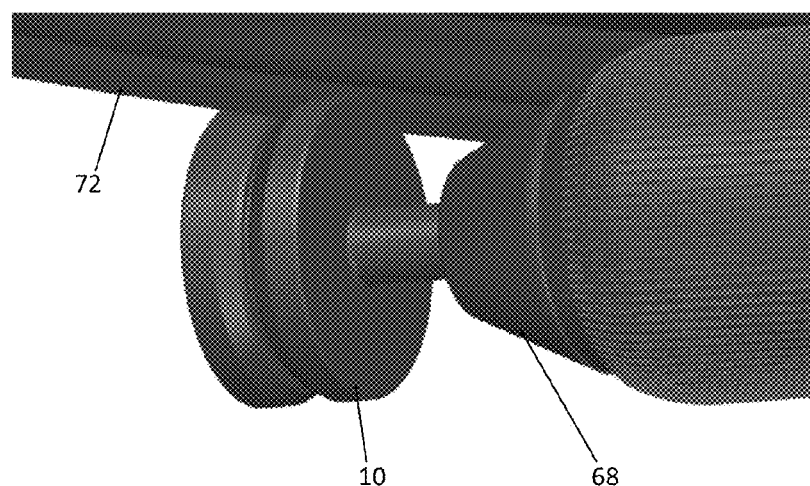
FIG. 7C is a close up perspective view of FIG. 7A.
Figure 7D:
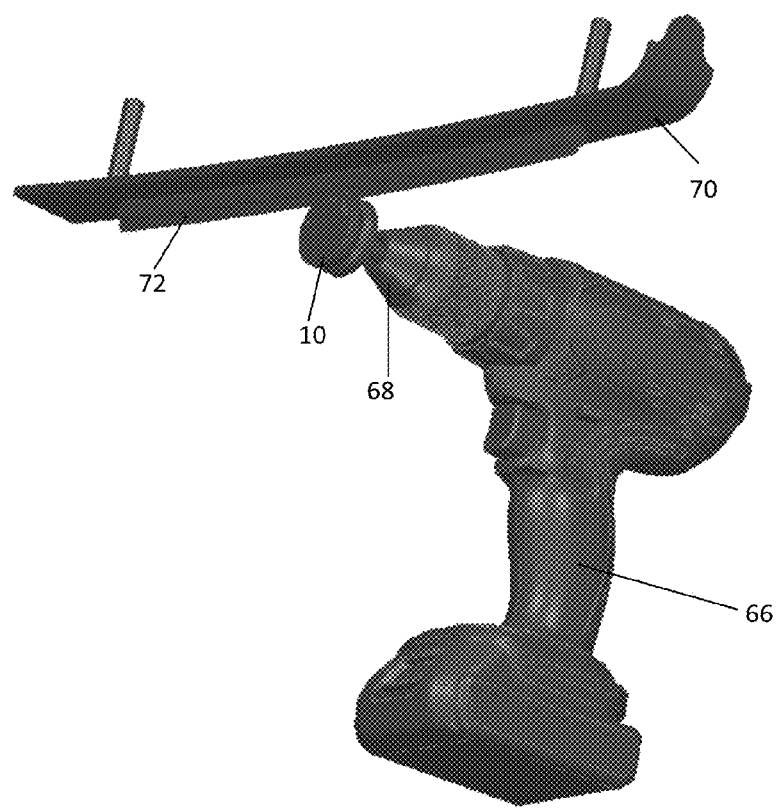
FIG. 7D is a perspective view of FIG. 7A showing the entire wear bar.

Now referring to FIGS. 7A through 7D, views of sharpening tool 10 attached to hand held drill 66 are shown. As shown most clearly in FIGS. 7B and 7C, sharpening tool 10 is attached to chuck 68 of hand held drill 66. Chuck 68 grips shaft 12 of sharpening tool 10 as it would a drill bit so that sharpening tool 10 spins rapidly like a drill bit when hand held drill 66 is operated. FIG. 7D demonstrates how sharpening tool 10 may be easily applied to dull wear rail 72 when sharpening tool 10 is attached to hand held drill 66 as shown.

Referring now to FIG. 8, some embodiments of the sharpening tool 10 include multiple rail grooves 28 disposed about the cylindrical head 18. In the embodiment of FIG. 8, two rail grooves 28 are disposed between the top surface 20 and bottom surface 22 of the head 18. This arrangement allows the life of the sharpening tool 10 to be doubled as, once the abrasive material in one rail groove 28 is no longer effective, the user may use the other rail groove 28. Although only two rail grooves 28 are shown, it is recognized that more than two rail grooves 28 may be disposed about the head 18.

It is envisioned that the sharpening tool 10 of the present invention will be sold as a standalone product. However, it is also recognized that the sharpening tool may be sold as a part of a sharpening system that includes the sharpening tool 10 and a rotating power tool, such as the hand held drill 66 shown in FIGS. 7A-7D. In addition, it may be sold as part of a kit that includes the sharpening tool 10 and a steering member having at least one wear rail. The steering member may be a snowmobile ski, ski runner, or a wear bar, such as those shown in FIGS. 7A-7D, upon which at least one wear rail 72 is disposed.

Figure 9:
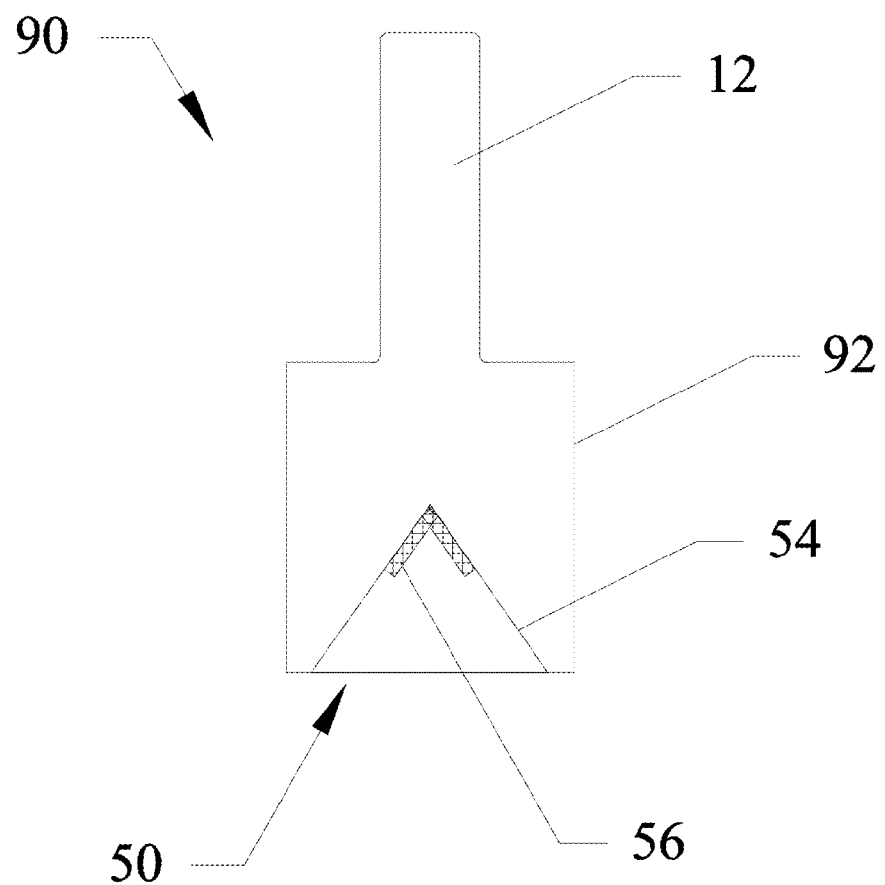
FIG. 9 is a cutaway side view of a stud sharpener that is part of some embodiments of the kit of the present invention.

Some embodiments of the kit also include a separate stud sharpening tool for sharpening studs disposed upon snowmobile tracks. One embodiment of such as stud sharpener tool 90 is shown in FIG. 9. The stud sharpening tool 90 includes a shaft 12 and a cylindrical body 92 into which a stud groove 50 is formed. Stud groove 50 includes a surface 54 with an abrasive material 56 against which a stud may be sharpened. It is preferred that the stud sharpening tool 90 be substantially similar to the stud sharpener 42 described with reference to FIGS. 5 and 6. However, it is recognized that other art recognized stud sharpening tools may be utilized to achieve similar results.

Figure 10:
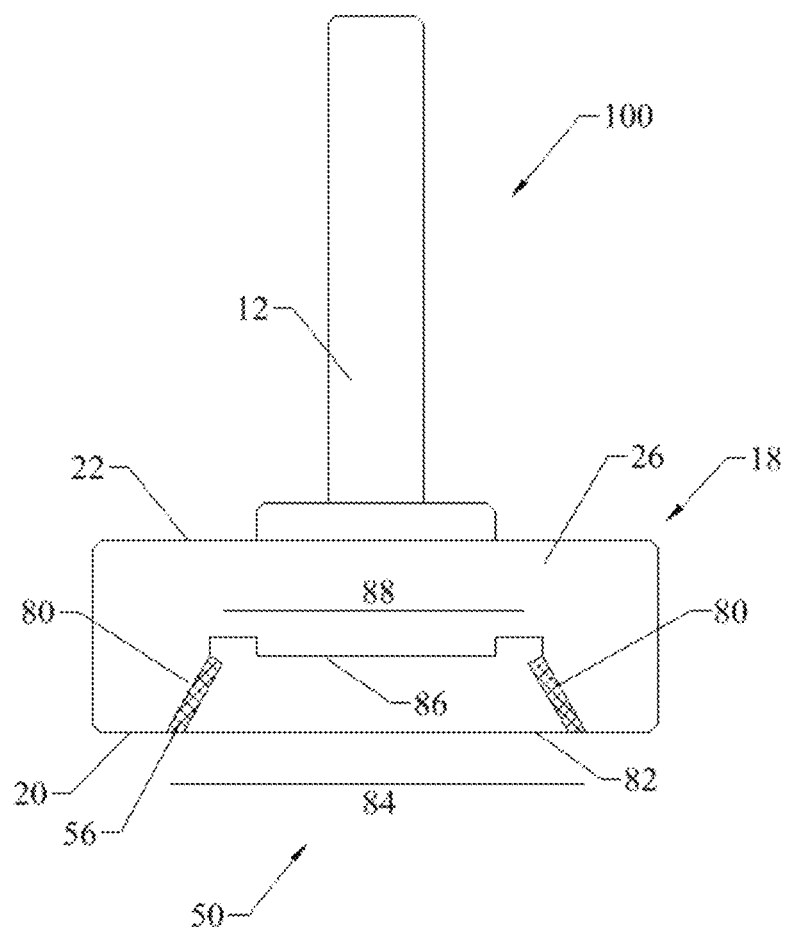
FIG. 10 is a cross-sectional view of an alternate stud sharpener of the present invention.

Now referring to FIG. 10, a cross-sectional view of stud sharpening tool 100 is provided. Compare stud sharpener tool 100 with stud sharpener tool 90, shown in FIG. 9. Each stud sharpener tool includes a round body 28, a shaft 12, and a stud groove 50 that is at least partially coated with abrasive material 56, which is preferably a diamond material, such as diamond grit or electroplated diamonds. The stud sharpener tool 90, shown in FIG. 9 has a v-shaped stud groove 50 and includes the abrasive material 56 in the tip of the "V" of the stud groove 50. The inventor has discovered that this version has certain drawbacks. In particular, the smaller diameter of the stud sharpener tool 90 sometimes makes it difficult to correctly position the stud 74 to be grinded within the stud groove 50. In addition, having the abrasive material 56 coating the tip of the "V" of the stud groove 50, as shown in FIG. 9, is a manufacturing challenge. The inventor has addressed these issues with the stud sharpener tool 100, shown in FIG. 10. The larger diameter of stud sharpener tool 100 makes it easier to position the stud 74 to be grinded within the stud sharpener tool 100 and allows the operator to move the stud 74 to be grinded around within the stud sharpener tool 100 for maximum effect. The stud sharpener tool 100 with the abrasive material 56 as shown around the larger diameter is also easier to manufacture. Not only is it easier to manufacture, but the abrasive material 56 covers a larger area, and will therefore last longer.

Referring to FIG. 10, the cylindrical head 18 of stud sharpener tool 100 includes bottom face 22 and top face 20, and round body 26 stretching between the two. Stud groove 50 is indented into top face 20. Stud sharpener tool 100 has a wide opening 82 in top face 20 that narrows into narrow center 86 within the width of the round body 26. The angled sides 80 stretch between the wide opening 82 and the narrow center 86 and are covered with abrasive material 56. The top face 20 has a diameter between 3.6 and 3.8 cm, preferably 3.7 cm. The circular wide opening 82 preferably has a diameter between 2.7 and 2.9 cm, preferably 2.8 cm. The circular narrow center 86 preferably has a diameter between 2.2 and 2.4 cm, preferably 2.3 cm. Narrow center 86 may be flat or may have indentations, as shown, or other surface features that keep it from being completely flat.

Figure 11:
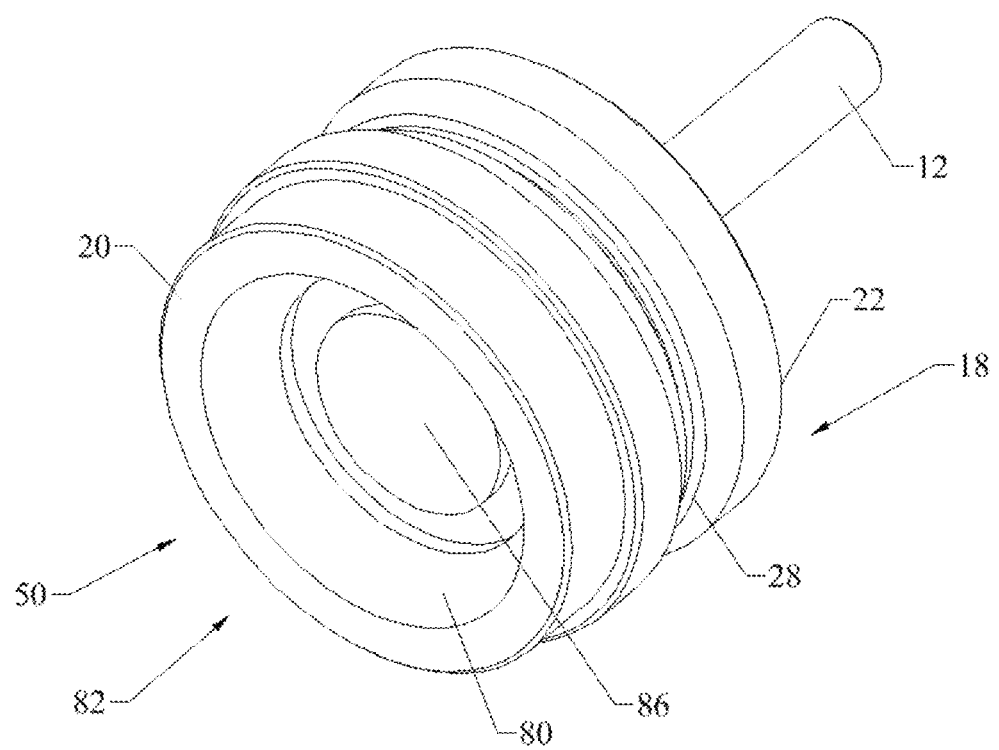
FIG. 11 is a perspective view of a sharpening tool of the present invention including a stud sharpener.

Now referring to FIG. 11, a perspective view of a sharpening tool including stud groove 50 is provided. As shown in FIG. 10, the sharpening tool includes stud groove 50 in top face 20 that includes wide opening 80 narrowing to narrow center 86 through angled sides 80. Although not shown here, it is understood that angled sides 80 are coated with abrasive material 56. The sharpening tool also includes rail groove 28 for sharpening wear rails. This feature is described in more detail below.

Figure 12:
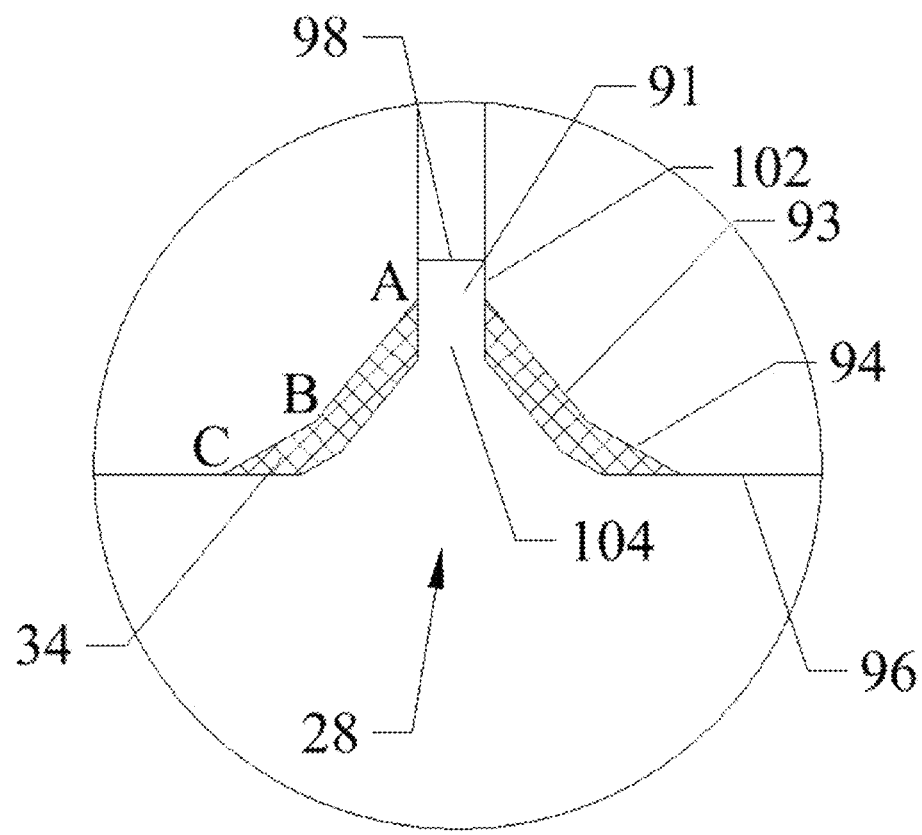
FIG. 12 is blown up details of a rail groove of a third sharpening tool of the present invention.

Now referring to FIG. 12, a blown up detailed view of a rail groove 28 is provided. Compare FIG. 12 with FIG. 3C. The main difference between these figures is the small gap 31 in FIG. 3C and the unobstructed space 91 in FIG. 12. The sides of the rail grooves 28 in both FIGS. 3C and 12 are covered with an abrasive material 34. The abrasive material 34 in FIG. 3A extends farther into the rail groove 28 on either side so that there is only a very small gap 31 between the abrasive materials 34 on either side. The unobstructed space 91 in FIG. 12 provides a much larger gap between the abrasive material 34 coating the sides of the rail groove 28. This allows the tips of wear rails to be sharpened, which are positioned within the unobstructed space 91 to stay sharp and not be worn down even as the sides of the tip are ground against the abrasive material 34.

Now referring to FIG. 12 alone, rail groove 28 opens up from unobstructed space 91 into center sections 93 and then flare sections 94. Unobstructed space 91 includes a flat bottom 98 and sides 102 extending away from either side of flat bottom 98. Unobstructed space 91 allows for opening 104 into which tips of wear rail bars may be positioned. Center sections 93 extend outward from sides 102 at an obtuse angle A. Angle A is preferably 140°, but may vary between 130° and 150°. Flare sections 94 extend outward from center sections 93 at an obtuse angle B. Angle B is preferably 160°, but may vary between 150° and 170°. Flare sections 94 intersect with the surface 96 of round body 26 at an obtuse angle C. Angle C is preferably 150°, but may vary between 140° and 160°. Abrasive material 34, which is preferably a diamond material, such as diamond grit or electroplated diamonds, covers center sections 93 and flare sections 94 leaving opening 104 into unobstructed space 91.

Figure 13A:
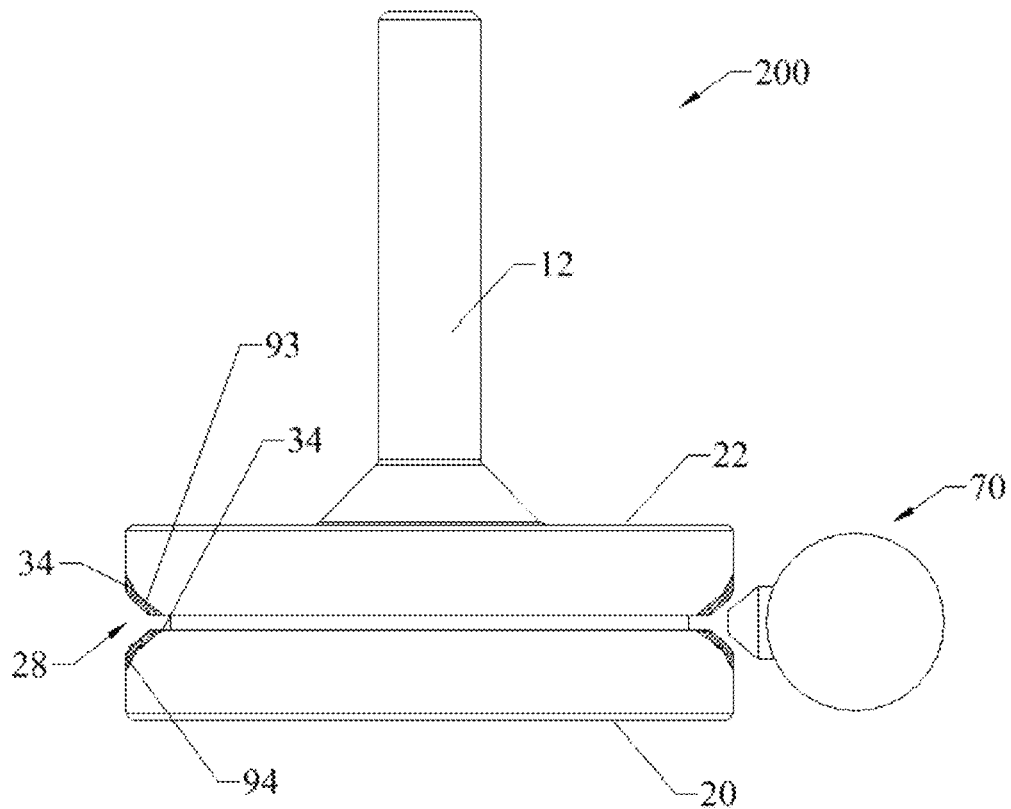
FIG. 13A is a side view of a dull wear bar being sharpened by a third sharpening tool of the present invention.

Now referring to FIG. 13A, a side view of a dull wear bar 70 is shown being applied to sharpening tool 200 for sharpening. As wear rails are continually sharpened, the sharp edge will eventually be worn down into a nub so that it is no longer usable. The inventor has found that although the sharpening tool shown in FIG. 3C, for example, is an excellent tool for sharpening dull wear rails, that the edges may be sharpened down to nubs after an unacceptably low number of sharpenings. As will be apparent to one of ordinary skill in the art, the sharp tip of a wear rail being sharpened by the sharpening tool 200, as shown in FIG. 13B, will remain sharp even as the sides of the tip are sharpened and worn down.

Figure 13B:
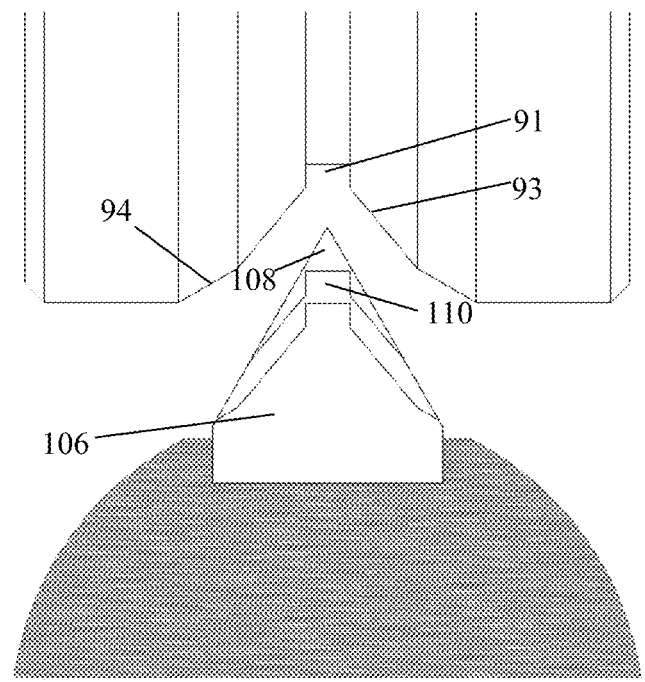
FIG. 13B is a blown up side view of a third sharpening tool of the present invention being used on a wear rail showing three states of wear.

Referring to FIG. 13B, for example, an example of the evolution of a wear rail through sharpenings is provided. Tip 108 is a representation of a tip that is new and has not yet been sharpened or worn down at all. Through use on the snowmobile, it will become dull and will require sharpening. As it is dulled through use and repeatedly sharpened by sharpening tool 200, its sharp v-shaped tip will be positioned in the unobstructed space 91, and as the sides are sharpened and worn down against center and flare sections 93, 94, the tip will evolve from the sharp "v" shape to the flattened tip of 110. Tip 110 grips the snow better than the unused tip 108 and the use of the sharpening tool 200 will also prolong the life of the wear rail through multiple sharpenings.

Figure 14:
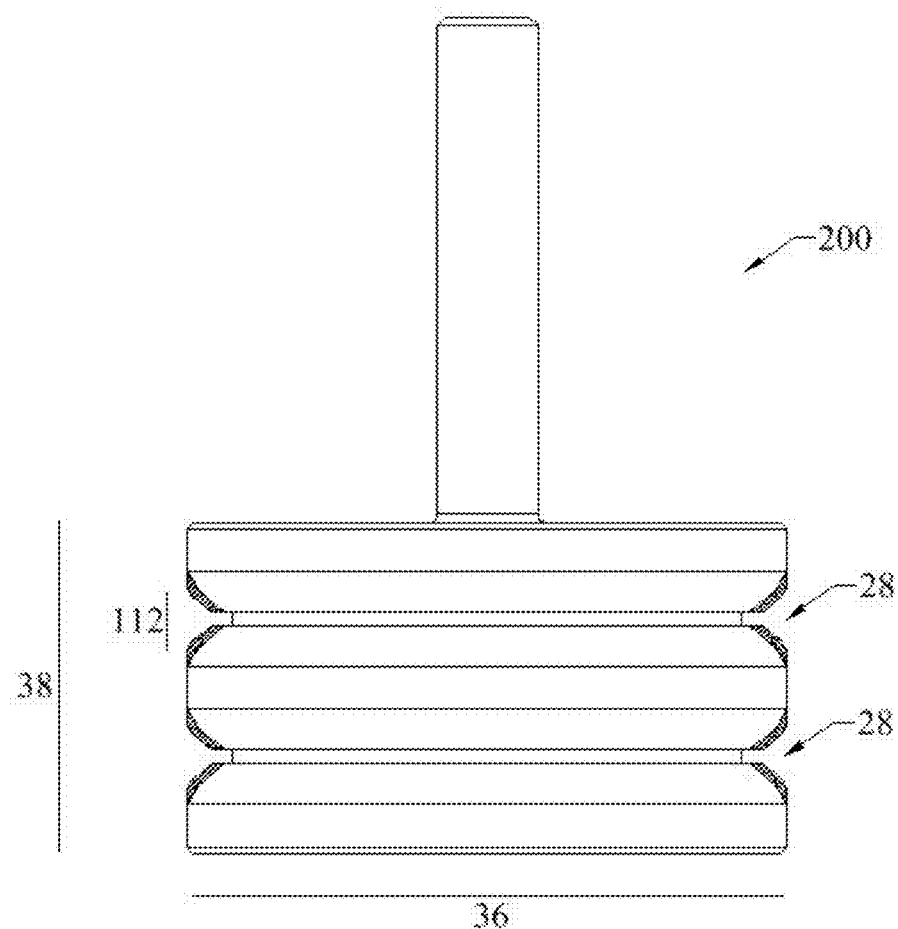
FIG. 14 is a side view of a third sharpening tool of the present invention including two rail grooves.

Now referring to FIG. 14, a side view of a sharpening tool 200 including two rail grooves 28 is provided. These rail grooves 28 include all the features described above with reference to FIGS. 12-13B, for example. The purpose of having more than one rail groove 28 is so that the sharpening tool 200 will last twice as long as an operator may alternate between rail grooves 28 so that each is used half as frequently. Alternatively, more than one dull rail bar may be sharpened simultaneously. This is particularly advantageous for snowmobile skis that include more than one rail bar per ski. Also shown in FIG. 14 are width 38 of cylindrical head 18; diameter 36 of cylindrical head 18; and distance 112 between the intersections of the surface 96 of round body 26 and flare sections 94. Compare FIG. 14 with FIG. 8. As with the comparison of FIGS. 3C and 12, the main difference between the figures is how far abrasive material 34 extends into rail grooves 28. In FIGS. 3C and 8, the abrasive material extends far into the rail grooves 28 so that only small gap 31 is present. In FIGS. 12 and 14, on the other hand, abrasive material 34 coats center and flare sections 93, 94, but leaves unobstructed space 91 at the center of rail grooves 28.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A sharpening tool capable of sharpening studs, said sharpening tool comprising:
    a shaft dimensioned for attachment to a rotating power tool; and
    a substantially cylindrical head extending from said shaft, said head comprising:
        a top face;
        a bottom face, wherein said shaft extends from a center of said bottom face;
        a round body extending between said top face and said bottom face; and
        a stud groove cut into said top face of said cylindrical head comprising:
            a circular wide opening in said top face comprising a wide opening diameter;
            a circular narrow substantially flat center comprising a narrow center diameter, wherein said narrow center diameter is less than said wide opening diameter;
            angled sides connecting said wide opening and said narrow center; and
            a first abrasive material disposed upon an entirety of each of said angled sides.

2. The sharpening tool as claimed in claim 1, wherein said first abrasive material is a diamond material.

3. The sharpening tool as claimed in claim 1, further comprising:
    at least one rail groove extending into said round body around a circumference of said round body between said top face and said bottom face such that said at least one rail groove runs parallel to a circumference of said top face and a circumference of said bottom face, wherein said rail groove comprises:
        two sides, a flat bottom disposed between said two sides, an opening disposed opposite from said flat bottom and between said two sides, and a space bound by said two sides and said flat bottom;
        center sections flaring outward from either of said two sides such that said center sections and said two sides form a first obtuse angle; and
    a second abrasive material disposed on said center sections.

4. The sharpening tool as claimed in claim 3, wherein said at least one rail groove further comprises flare sections flaring outward from said center sections such that said flare sections and said center sections form a second obtuse angle and said flare sections and a surface of said round body form a third obtuse angle.

5. The sharpening tool as claimed in claim 3, wherein said at least one rail groove is two rail grooves.

6. The sharpening tool as claimed in claim 3, wherein said first and second abrasive materials are diamond materials.

7. The sharpening tool as claimed in claim 4, wherein:
    said first obtuse angle is between 130° and 150°;
    said second obtuse angle is between 150° and 170°; and
    said third obtuse angle is between 140° and 160°.

8. The sharpening tool as claimed in claim 4, wherein:
    said cylindrical head comprises a diameter of between 2.9 and 3.1 cm;
    said cylindrical head comprises a width of between 1.8 and 2.0 cm;
    a distance between intersections of said flare sections and said surface of said round body is between 0.5 and 0.7 cm; and
    said flat bottom comprises a width of between 0.05 and 0.15 cm.

9. The sharpening tool as claimed in claim 4, wherein:
    said cylindrical head comprises a diameter of between 3.6 and 3.8 cm;
    said cylindrical head comprises a width of between 1.05 and 1.25 cm;
    a distance between intersections of said flare sections and said surface of said round body is between 0.6 and 0.8 cm; and
    said flat bottom comprises a width of between 0.05 and 0.15 cm.

10. A sharpening tool capable of sharpening carbide wear rails, said sharpening tool comprising:
    a shaft dimensioned for attachment to a rotating power tool; and
    a substantially cylindrical head extending from said shaft, said head comprising:
        a top face;
        a bottom face, wherein said shaft extends from a center of said bottom face;
        a round body extending between said top face and said bottom face; and
    at least one rail groove extending into said round body around a circumference of said round body between said top face and said bottom face such that said at least one rail groove runs parallel to a circumference of said top face and a circumference of said bottom face, wherein said rail groove comprises:
        two sides, a flat bottom disposed between said two sides, an opening disposed opposite from said flat bottom and between said two sides, and a space bound by said two sides and said flat bottom;
        center sections flaring outward from either of said two sides such that said center sections and said two sides form a first obtuse angle; and
        a first abrasive material disposed on said center sections.

11. The sharpening tool as claimed in claim 10, wherein said at least one rail groove further comprises flare sections flaring outward from said center sections such that said flare sections and said center sections form a second obtuse angle and said flare sections and a surface of said round body form a third obtuse angle.

12. The sharpening tool as claimed in claim 10, wherein said at least one rail groove is two rail grooves.

13. The sharpening tool as claimed in claim 11, wherein said first abrasive material is also disposed on said flare sections.

14. The sharpening tool as claimed in claim 11, wherein:
said cylindrical head comprises a diameter of between 2.9 and 3.1 cm;
said cylindrical head comprises a width of between 1.8 and 2.0 cm;
a distance between intersections of said flare sections and said surface of said round body is between 0.5 and 0.7 cm; and
said flat bottom comprises a width of between 0.05 and 0.15 cm.

15. The sharpening tool as claimed in claim 11, wherein:
said cylindrical head comprises a diameter of between 3.6 and 3.8 cm;
said cylindrical head comprises a width of between 1.05 and 1.25 cm;
a distance between intersections of said flare sections and said surface of said round body is between 0.6 and 0.8 cm; and
said flat bottom comprises a width of between 0.05 and 0.15 cm.

16. The sharpening tool as claimed in claim 11, wherein:
said first obtuse angle is between 130° and 150°;
said second obtuse angle is between 150° and 170°; and
said third obtuse angle is between 140° and 160°.

17. The sharpening tool as claimed in claim 11, further comprising:
a rail groove cut into said top face of said cylindrical head comprising:
a circular wide opening in said top face comprising a wide opening diameter;
a circular narrow substantially flat center comprising a narrow center diameter,
wherein said narrow center diameter is less than said wide opening diameter;
angled sides connecting said Wide opening and said narrow center; and
a second abrasive material disposed upon each of said angled sides.

18. The sharpening tool as claimed in claim 17, wherein:
said top face is between 3.6 and 3.8 cm in diameter;
said wide opening diameter is between 2.7 and 2.9 cm; and
said narrow center diameter is between 2.2 and 2.4 cm.

19. The sharpening tool as claimed in claim 17, wherein said first and second abrasive materials are diamond materials.

20. The sharpening tool as claimed in claim 13, wherein said first abrasive material is a diamond material.

* * * * *